United States Patent
Lee et al.

(10) Patent No.: US 9,780,937 B2
(45) Date of Patent: *Oct. 3, 2017

(54) METHOD FOR CHANNEL SOUNDING IN WIRELESS LOCAL AREA NETWORK AND APPARATUS FOR THE SAME

(71) Applicant: LG ELECTRONICS INC., Seoul (KR)

(72) Inventors: Dae Won Lee, Anyang-si (KR); Ill Soo Sohn, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,881

(22) Filed: Jan. 12, 2016

(65) Prior Publication Data

US 2016/0173259 A1    Jun. 16, 2016

Related U.S. Application Data

(63) Continuation of application No. 14/570,958, filed on Dec. 15, 2014, now Pat. No. 9,270,438, which is a
(Continued)

(30) Foreign Application Priority Data

Jul. 22, 2011    (KR) ................ 10-2011-0072845

(51) Int. Cl.
*H04L 5/00*    (2006.01)
*H04B 7/06*    (2006.01)
(Continued)

(52) U.S. Cl.
CPC ......... *H04L 5/0053* (2013.01); *H04B 7/0636* (2013.01); *H04L 1/1812* (2013.01);
(Continued)

(58) Field of Classification Search
CPC ......... H04B 7/06; H04B 17/21; H04L 1/0027; H04L 1/18; H04L 1/1614; H04L 5/00; H04M 13/39; H04W 4/00; H04W 16/28
See application file for complete search history.

(56) References Cited

U.S. PATENT DOCUMENTS 6,269,080 B1 * 7/2001 Kumar .................. H04L 1/1614
370/236
6,958,781 B2 * 10/2005 Fimoff .................. H03M 13/39
348/555
(Continued)

FOREIGN PATENT DOCUMENTS

CN    101030841 A    9/2007
CN    1765064 A    4/2008
(Continued)

OTHER PUBLICATIONS

Fischer et al., "Link Adaptation Subfield for VHT," IEEE 802.11-10/1095r0, Sep. 12, 2010, pp. 1-5.
(Continued)

*Primary Examiner* — Raj Jain
*Assistant Examiner* — Leon Andrews
(74) *Attorney, Agent, or Firm* — Birch, Stewart, Kolasch & Birch, LLP

(57) ABSTRACT

A method, performed by a transceiver, is provided for channel sounding in a wireless local area network. A null data packet announcement (NDPA) frame is received from a transmitter to initiate the channel sounding. A null data packet (NDP) is received from the transmitter, the NDP following the NDPA frame. First feedback data split into a plurality of segments in a single aggregated medium access control protocol data unit (A-MPDU) is transmitted. A retransmission request is received from the transmitter, the retransmission request including a segment retransmission bitmap field indicating at least one segment of the plurality
(Continued)

of segments for retransmission. In response to the retransmission request, second feedback data including the at least one segment indicated in the segment retransmission bitmap field is transmitted.

12 Claims, 11 Drawing Sheets

Related U.S. Application Data continuation of application No. 13/307,774, filed on Nov. 30, 2011, now Pat. No. 8,942,214.

(60) Provisional application No. 61/423,589, filed on Dec. 16, 2010, provisional application No. 61/418,417, filed on Dec. 1, 2010.

(51) Int. Cl.
  H04W 84/12 (2009.01)
  H04L 1/18 (2006.01)
  H04W 16/28 (2009.01)
  H04B 7/0452 (2017.01)

(52) U.S. Cl.
  CPC ........... *H04W 16/28* (2013.01); *H04W 84/12* (2013.01); *H04B 7/0452* (2013.01); *H04L 5/0023* (2013.01)

(56) References Cited

U.S. PATENT DOCUMENTS

| | | | |
|---|---|---|---|
| 8,040,993 | B2 | 10/2011 | Sim et al. |
| 8,270,909 | B2 | 9/2012 | Zhang et al. |
| 8,428,168 | B1 | 4/2013 | Zhang et al. |
| 8,498,362 | B2 | 7/2013 | Zhang et al. |
| 8,630,195 | B2 | 1/2014 | Trainin |
| 8,665,795 | B2 | 3/2014 | Ketchum et al. |
| 8,681,815 | B1 | 3/2014 | Liu et al. |
| 2007/0189412 | A1 | 8/2007 | Xia et al. |
| 2007/0195811 | A1 | 8/2007 | Basson et al. |
| 2007/0298742 | A1 | 12/2007 | Ketchum et al. |
| 2008/0049654 | A1 | 2/2008 | Otal et al. |
| 2009/0298509 | A1 | 12/2009 | Hoshino et al. |
| 2009/0319852 | A1 | 12/2009 | Nabetani |
| 2010/0080173 | A1 | 4/2010 | Takagi |
| 2010/0111220 | A1 | 5/2010 | Rouquette-Leveil et al. |
| 2010/0180171 | A1 | 7/2010 | Liu et al. |
| 2010/0260138 | A1 | 10/2010 | Liu et al. |
| 2010/0271992 | A1* | 10/2010 | Wentink ................ H04B 17/21 370/310 |
| 2010/0309834 | A1 | 12/2010 | Fischer et al. |
| 2010/0322166 | A1 | 12/2010 | Sampath et al. |
| 2011/0002219 | A1 | 1/2011 | Kim et al. |
| 2011/0075607 | A1 | 3/2011 | Kim et al. |
| 2011/0128947 | A1 | 6/2011 | Liu et al. |
| 2011/0224021 | A1 | 9/2011 | Tutmark |
| 2011/0235533 | A1 | 9/2011 | Breit et al. |
| 2011/0243026 | A1 | 10/2011 | Kim et al. |
| 2012/0076179 | A1 | 3/2012 | Stacey et al. |
| 2012/0177018 | A1* | 7/2012 | Abraham ............... H04L 1/0027 370/338 |

FOREIGN PATENT DOCUMENTS

| | | |
|---|---|---|
| EP | 1 626 591 A2 | 2/2006 |
| JP | 2009-514360 A | 4/2009 |
| JP | 2009-514465 A | 4/2009 |
| JP | 2009-543471 A | 12/2009 |
| JP | 2013-521874 A | 6/2013 |
| RU | 2009 102 533 A | 8/2010 |
| WO | WO 2007/050729 A1 | 5/2007 |
| WO | WO 2007/051187 A1 | 5/2007 |
| WO | WO 2007/078219 A1 | 7/2007 |
| WO | WO 2007/083699 A1 | 7/2007 |
| WO | WO 2008/002972 A2 | 1/2008 |
| WO | WO 2009/027931 A2 | 3/2009 |
| WO | WO 2009/128604 A1 | 10/2009 |
| WO | WO 2010/068086 A2 | 6/2010 |
| WO | WO 2010/118383 A1 | 10/2010 |
| WO | WO 2011/112481 A1 | 9/2011 |
| WO | WO 2012/015737 A1 | 2/2012 |

OTHER PUBLICATIONS

Gong et al., "Training Protocols for Multi-User MIMO Wireless LANs," IEEE 21st International Symposium on Personal Indoor and Mobile Radio Communications (PIMRC), Sep. 26-30, 2010, 7 pages.
IEEE Std 802.11n; "IEEE Standard for Information technology Telecommunications and Information . . . ", IEEE; Oct. 29, 2009; 636 pages.
Merlin et al., "Protocol for SU and MU Sounding Feedback," IEEE 802.11-10/1091r0, Sep. 14, 2010, slides 1-7.
Merlin et al., "Sounding Protocol—Segmentation and Null Feedback," IEEE 802.11-11/0041r0, Jan. 18, 2011, slides 1-18.
Mirkovic et al., "Design and Performance Analysis of MIMO Based WLANs," Chair of Communication Networks (ComNets), Faculty 6, RWTH Aachen University, Dec. 2008, 3 pages.
Office Action issued in Sep. 25, 2013 in Japanese Patent Application No. 2013-501204.
Tianji Li et al.; "Aggregation With Fragment Retransmission for Very High-Speed WLANs", IEEE/ACM Transactions on Networking; vol. 17, No. 2, Apr. 2009; pp. 591-604.
IEEE, "Part 11: Wireless LAN Medium Access Control (MAC) and Physical Layer (PHY) Specifications" Amendment 5: Enhancements for Higher Throughput, IEEE Computer Society, LAN/MAN Standards Committee, IEEE Std 802.11n-2009, Oct. 29, 2009, 83 pages.

* cited by examiner

METHOD FOR CHANNEL SOUNDING IN WIRELESS LOCAL AREA NETWORK AND APPARATUS FOR THE SAME

CROSS-REFERENCE TO RELATED APPLICATIONS

This application is a Continuation of copending U.S. patent application Ser. No. 14/570,958 filed on Dec. 15, 2014 (now U.S. Pat. No. 9,270,438, issued Feb. 23, 2016), which is a continuation of U.S. patent application Ser. No. 13/307,774 filed on Nov. 30, 2011 (now U.S. Pat. No. 8,942,214, issued Jan. 27, 2015), which claims priority under 35 U.S.C. §119(e) to U.S. Provisional Application Ser. Nos. 61/423,589 filed on Dec. 16, 2010 and 61/418,417 filed on Dec. 1, 2010, and under 35 U.S.C.§119(a) to Application No. 10-2011-0072845, filed in the Republic of Korea on Jul. 22, 2011, all of which are hereby expressly incorporated by reference into the present application.

BACKGROUND

The present invention relates to a wireless local area network (WLAN) system, and more particularly, to a channel sounding procedure between stations (STAs) in the WLAN system and an apparatus for supporting the procedure.

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

The next-generation WLAN system supports the transmission of a Multi-User Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired STAs at the same time.

The AP and the plurality of MU-MIMO paired STAs may have different capabilities. In this case, a supportable bandwidth, modulation coding scheme (MCS), forward error correction (FEC), etc., may vary depending on an STA type, usage, channel environment, etc.

In the WLAN system, an AP and/or an STA can acquire information on a channel to be used to transmit a frame to a reception target AP and/or STA. This can be performed by using a channel sounding procedure. That is, a process in which a transmitter requests a receiver to send channel information to be used for frame transmission and reception and the receiver estimates a channel and feeds back channel information thereof to the transmitter can be performed before transmitting and receiving a data frame. Meanwhile, since the next generation WLAN system employs a wider channel bandwidth and a MU-MIMO transmission scheme, a more amount of channel information can be received from a transmission target AP and/or STA. In order to transmit a more amount of feedback information, the transmission target AP and/or STA needs to access to a channel for a longer period of time. When interference occurs in a part of the feedback information transmitted and received during this period, there is a need to discard whole feedback information and thus new feedback information is necessary. This may cause deterioration in terms of efficiency of resource usage and reliability of a channel sounding procedure. Accordingly, there is a need for a channel sounding method capable of solving the aforementioned problem in a next generation WLAN system.

SUMMARY

The present invention provides a sounding method performed by a station (STA) in a next generation wireless local area network (WLAN) system supporting a multi user-multiple input multiple output (MU-MIMO) transmission scheme.

In an aspect, a channel sounding method in a wireless local area network (WLAN) system is provided. The method, performed by a transmitter, includes transmitting a null data packet announcement (NDPA) frame to a receiver to initiate a channel sounding procedure; transmitting a null data packet (NDP) to the receiver and receiving a feedback frame. The feedback frame includes a plurality of segment frames and a channel feedback report, the channel feedback report is split into a plurality of feedback segments, each of the plurality of feedback segments is respectively included in each of the plurality of segment frames. The each of the plurality of segment frames includes a first-segment subfield indicating whether the each of the plurality of feedback segment included is a first segment and a remaining-segment subfield indicating the number of remaining feedback segments.

The method may further include determining whether at least one feedback segment is missed on the basis of the first-segment subfield and the remaining-segment subfield and transmitting retransmission request information for the missed feedback segment, when a missed feedback segment is detected.

The plurality of feedback segments may be equal in size except for a last feedback segment.

The feedback frame may be an aggregate medium access control (MAC) protocol data unit (A-MPDU) transported as a data unit managed in a physical layer, and the segment frame is a MAC protocol data unit (MPDU) which is mutually exchanged in a MAC entity of the WLAN system.

If a size of the channel feedback report is greater than or equal to a specific value, the channel feedback report may be split into the plurality of feedback segments.

The channel feedback report may include feedback information used by the transmitter to determine a steering matrix.

The channel feedback report may further include feedback information for a signal to ratio (SNR) for each spatial stream.

The retransmission request information may be a bitmap sequence in which a bit value corresponding to an index of the missed feedback segment is set to 1.

The method may further include receiving the missed feedback segment from the receiver.

In another aspect, a channel sounding method in a WLAN system is provided. The method, performed by a receiver, includes receiving an NDPA frame transmitted by a transmitter to initiate a channel sounding procedure, generating a feedback frame including a channel feedback report and transmitting the feedback frame to the transmitter. The NDPA frame includes an identifier of the receiver. The generating of the feedback frame includes splitting the channel feedback report into a plurality of feedback segments and generating the feedback frame by including a plurality of segment frames in the feedback frame. Each of the plurality of segment frames respectively includes each of the plurality of feedback segments, a first-segment subfield indicating whether the each of the plurality of feedback segments included is a first segment and a remaining-segment subfield indicating the number of remaining feedback segment.

In still another aspect, a wireless apparatus is provided. The apparatus includes a transceiver transmitting and receiving a frame and a processor operationally coupled to the transceiver. The processor is configured for: transmitting a null data packet announcement (NDPA) frame to a receiver to initiate a channel sounding procedure; transmitting a null data packet (NDP) to the receiver; and receiving a feedback frame. The feedback frame includes a plurality of segment frames and a channel feedback report. The channel feedback report is split into a plurality of feedback segments. Each of the plurality of feedback segments is respectively included in each of the plurality of segment frames. The each of the plurality of segment frames includes a first-segment subfield indicating whether the each of the plurality of feedback segment included is a first segment and a remaining-segment subfield indicating the number of remaining feedback segments.

DESCRIPTION OF EXEMPLARY EMBODIMENTS

Figure 1:
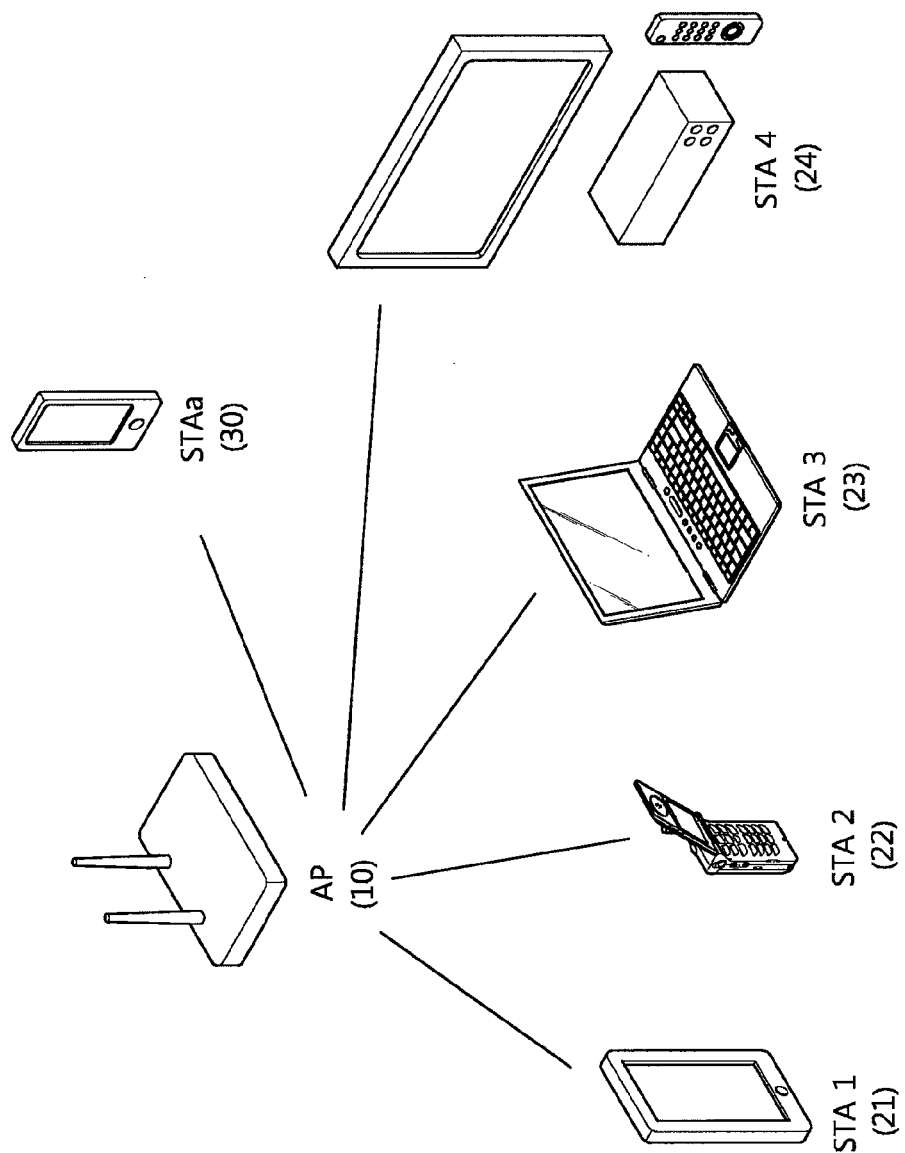
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to as the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The AP and/or the STA may perform a procedure of exchanging a request to send (RTS) frame and a clear to send (CTS) frame to announce that it intends to access a medium. The RTS frame and the CTS frame include information indicating a time duration reserved for access of a radio medium required to transmit and receive an acknowledgement (ACK) frame when an actual data frame transmission and reception ACK is supported. Upon receiving an RTS frame transmitted from an AP and/or an STA intending to transmit a frame or upon receiving a CTS frame transmitted from a frame transmission target STA, another STA can be configured not to access to the medium for the time duration indicated by the information included in the RTS/CTS frame. This can be implemented by configuring an NAV for the time duration.

Unlike the conventional WLAN system, the next generation WLAN system requires a higher throughput. This is called a very high throughput (VHT). For this, the next generation WLAN system intends to support 80 MHz, contiguous 160 MHz, non-contiguous 160 MHz bandwidth transmission and/or higher bandwidth transmission. In addition, a multi user-multiple input multiple output (MU-MIMO) transmission scheme is provided for the higher throughput. In the next generation WLAN system, an AP can transmit a data frame simultaneously to at least one or more MIMO-paired STAs. In the WLAN system of FIG. 1, an AP 10 can transmit data simultaneously to an STA group including at least one or more STAs among a plurality of STAs 21, 22, 23, 24, and 30 associated with the AP 10. In this case, data transmitted to each STA can be transmitted through different spatial streams. A data frame transmitted by the AP 10 can be referred to as a physical layer convergence procedure (PLCP) protocol data unit (PPDU) generated and transmitted in a physical layer (PHY) of the WLAN system. It is assumed in the embodiment of the present invention that a transmission target STA group which is MU-MIMO paired with the AP 10 is the STA1 21, the STA2 22, the STA3 23, and the STA4 24. In this case, the spatial stream may not be allocated to a specific STA in the transmission target STA group and thus data may not be transmitted. Meanwhile, it is assumed that the STAa 30 is an STA which is associated with the AP but is not included in the transmission target STA group.

Figure 2:
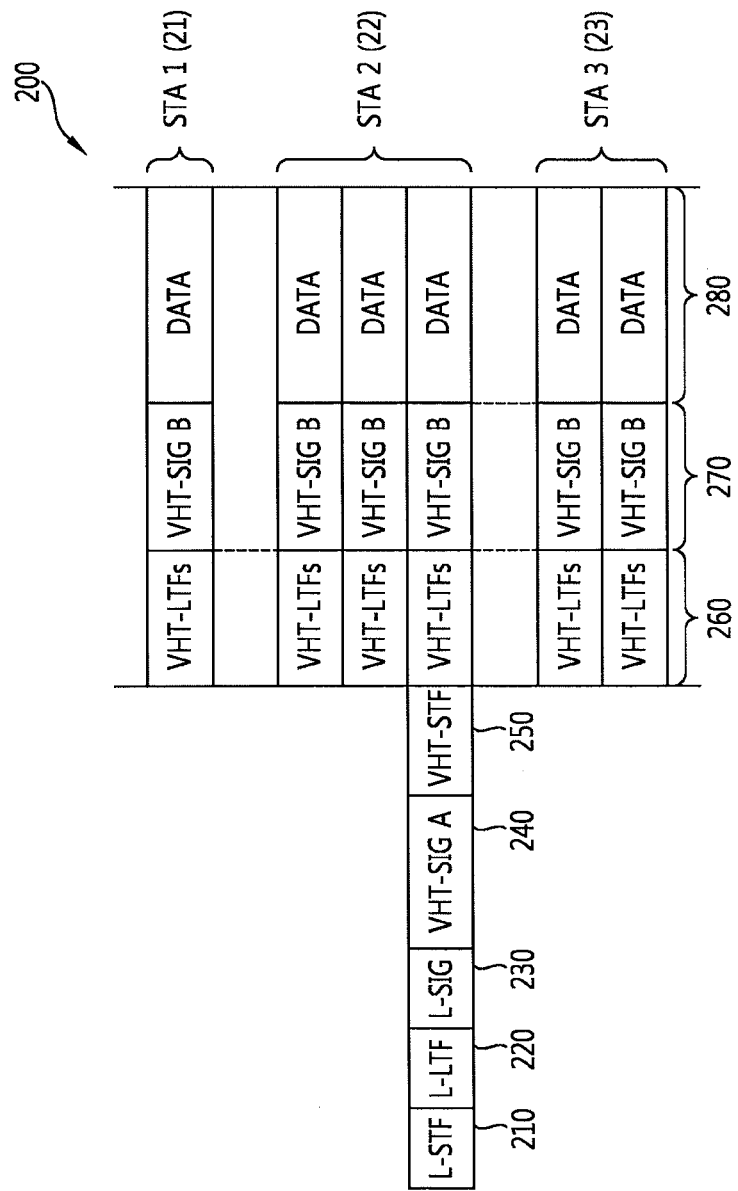
FIG. 2 shows an example of a PPDU format according to an embodiment of the present invention.

FIG. 2 shows an example of a PPDU format according to an embodiment of the present invention.

Referring to FIG. 2, a PPDU 200 includes an L-STF field 210, an L-LTF field 220, an L-SIG field 230, a VHT-SIGA field 240, a VHT-STF field 250, a VHT-LTF field 260, a VHT-SIGB field 270, and a data field 280.

A PLCP sub-layer constituting a PHY converts a PLCP service data unit(PSDU) delivered from a MAC layer into the data field 280 by appending necessary information to the PSDU, generates the PPDU 200 by appending several fields such as the L-STF field 210, the L-LTF field 220, the L-SIG field 230, the VHT-SIGA field 240, the VHT-STF field 250, the VHT-LTF field 260, the VHT-SIGB field 270, or the like, and delivers the PPDU 200 to one or more STAs through a physical medium dependent (PMD) sub-layer constituting the PHY.

The L-STF field 210 is used for frame timing acquisition, automatic gain control (AGC) convergence, coarse frequency acquisition, etc.

The L-LTF field 220 is used for channel estimation for demodulation of the L-SIG field 230 and the VHT-SIGA field 240.

The L-SIG field 230 is used when an L-STA receives the PPDU to acquire data.

The VHT-SIGA field 240 includes control information for interpreting the received PPDU 200 as common control information required for VHT-STAs which are MIMO-paired with an AP. The VHT-SIGA field 240 includes information on a spatial stream for each of the plurality of MIMO-paired STAs, bandwidth information, identification information regarding whether space time block coding (STBC) is used, a group identifier for a transmission target STA group, information regarding a spatial stream allocated to an STA included in a transmission target group STA indicated by the group identifier, information regarding a short guard interval (GI) of the transmission target STA, coding information, modulation and coding scheme (MCS) information, information indicating whether beamforming is performed, and CRC related information. Herein, the group identifier may include whether a currently used MIMO transmission method is MU-MIMO or SU-MIMO. The VHT-SIGA field 240 may be transmitted by using two OFDM symbols. In this case, a field related to a symbol that comes first can be referred to as a VHT-SIGA1, and a field related to a subsequent symbol can be referred to as a VHT-SIGA2 field.

The VHT-STF field 250 is used to improve performance of AGC estimation in MIMO transmission.

The VHT-LTF field 260 is used when the STA estimates a MIMO channel. Since the next generation WLAN system supports MU-MIMO, the VHT-LTF field 260 can be configured by the number of spatial streams on which the PPDU 200 is transmitted. In addition, when full channel sounding is supported and is performed, the number of VHT-LTFs may increase.

The VHT-SIGB field 270 includes dedicated control information required when the plurality of MIMO-paired STAs receive the PPDU 200 to acquire data. Therefore, the STA may be designed such that the VHT-SIGB field 270 is decoded only when the common control information included in the VHT-SIGB field 270 indicates that the currently received PPDU 200 is transmitted using MU-MIMO transmission. On the contrary, the STA may be designed such that the VHT-SIGB field 270 is not decoded when the common control information indicates that the currently received PPDU 200 is for a single STA (including SU-MIMO).

The VHT-SIGB field 270 includes length information of a PSDU included in the data field transmitted to each STA, MSC information, and tail related information included in the data field. Further, the VHT-SIGB field 270 includes information on encoding and rate-matching. A size of the VHT-SIGB field 270 may differ according to the MIMO transmission method (MU-MIMO or SU-MIMO) and a channel bandwidth used for PPDU transmission.

The data field 280 includes data intended to be transmitted to the STA. The data field 280 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field.

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 2, no spatial stream may be allocated to the STA4 24, and a specific number of spatial streams may be allocated to each of the STA1 21, the STA2 22, and the STA3 23 and then data can be transmitted according thereto. In the example of FIG. 2, one spatial stream is allocated to the STA1 21, three spatial streams are allocated to the STA2 22, and two spatial streams are allocated to the STA3 23.

One of the most significant features of the next generation WLAN system is that an overall system throughput can be improved according to a MU-MIMO transmission scheme in which several spatial streams are transmitted to a plurality of STAs by using multiple antennas. In a situation where the plurality of STAs are present, an AP intending to perform data transmission transmits a PPDU through a beamforming procedure to transmit data to a transmission target STA group. Therefore, since an AP and/or an STA intending to transmit the PPDU requires channel information for each transmission target STA, a channel sounding procedure is necessary to acquire the channel information.

Two schemes are supported for the channel sounding procedure. One is a scheme based on a normal PPDU including a data field, and the other is a scheme based on a null data packet (NDP) not including the data field. Hereinafter, the NDP may also be referred to as a sounding frame.

Figure 3:
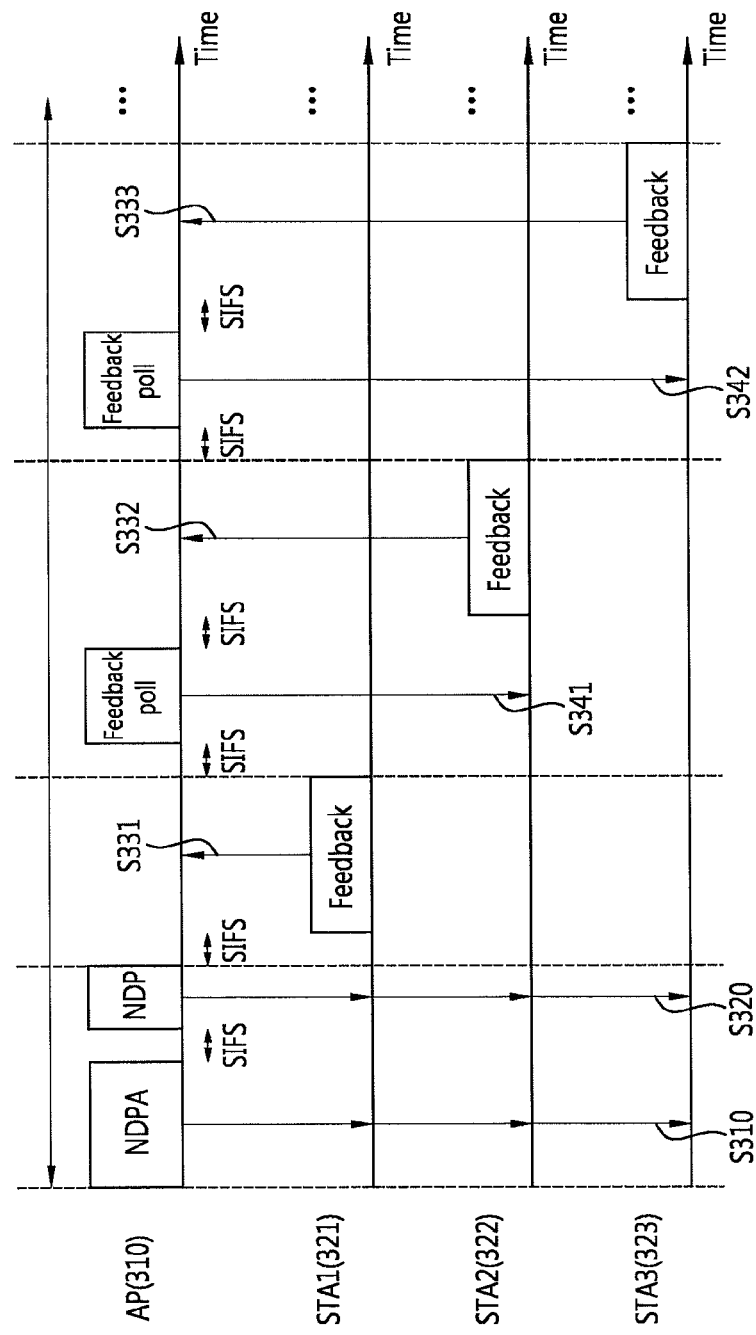
FIG. 3 is a diagram showing a channel sounding method using an NDP in a next generation WLAN system.

FIG. 3 is a diagram showing a channel sounding method using an NDP in a next generation WLAN system. In this embodiment, an AP performs channel sounding on three transmission target STAs in order to transmit data to the three transmission target STAs. However, the AP may perform channel sounding on one STA.

Referring to FIG. 3, an AP 310 transmits an NDP announcement (NDPA) frame to an STA1 321, an STA2 322, and an STA3 323 (step S310). The NDPA frame is for announcing information for identifying an STA for transmitting a feedback frame in response to an NDP transmitted subsequently. The AP 310 transmits the NDPA frame by inserting an STA information field including information on a sounding target STA into the NDPA frame. One STA information field may be included for each sounding target STA. The NDPA frame can be referred to as a sounding announcement frame.

As shown in FIG. 3, the AP 310 broadcasts the NDPA frame if the NDPA frame is transmitted to at least one sounding target STA for MU-MIMO channel sounding. On the other hand, if the NDPA frame is intended to be transmitted to one sounding target STA for SU-MIMO channel sounding, recipient address information included in the NDPA frame may be transmitted in a unicast manner by configuring it as a MAC address of the sounding target STA.

Table 1 below shows an example of an STA information field format included in the NDPA frame.

TABLE 1

| Subfield | Description |
| --- | --- |
| AID | Contain AID of sounding target STA |
| Feedback Type | Indicate feedback request type for sounding target STA<br>Set to 0 for SU-MIMO<br>Set to 1 for MU-MIMO |
| Nc Index | Indicate requested feedback dimension<br>In case of MU-MIMO:<br>Set to 0 if Nc = 1<br>Set to 1 if Nc = 2<br>Set to 2 if Nc = 3<br>Set to 3 if Nc = 4<br>Set to 4 if Nc = 5<br>Set to 5 if Nc = 6<br>Set to 6 if Nc = 7<br>Set to 7 if Nc = 8<br>In case of SU-MIMO, used as a reserved subfield (set to 1) |

In Table 1 above, Nc denotes the number of columns of beamforming feedback matrices among a plurality of pieces of feedback information transmitted by the sounding target STA to the AP in response to a received NDP.

Upon receiving the NDPA frame, STAs may confirm an AID subfield value included in the STA information field, and may determine whether the STAs are sounding target STAs. In the embodiment of FIG. 3, the NDPA frame may include an STA information field including an AID of the STA1 321, an STA information field including an AID of the STA2 322, and an STA information field including an AID of the STA3 323.

Subsequent to NDPA frame transmission, the AP 310 transmits an NDP to the sounding target STA (step S320). The NDP may have a format obtained by excluding a data field from the PPDU format of FIG. 2. The NDP frame is subjected to beamforming by the AP 310, and is transmitted to the sounding target STA by using at least one or more spatial streams. Therefore, sounding target STAs 321, 322, and 323 may estimate channels on the basis of a VHT-LTF of the NDP.

As control information included in the NDP in NDP transmission, length infoimation indicating a length of a PSDU included in the data field or a length of an aggregate-MAC protocol data unit (A-MPDU) included in the PSDU is set to 0, and information indicating the number of transmission target STAs is set to 1. A group ID indicating whether a transmission scheme used for NDP transmission is MU-MIMO or SU-MIMO and indicating a transmission target STA group is set to a value indicating SU-MIMO transmission. Information indicating the number of spatial streams allocated to the transmission target STA is set to a value corresponding to the number of spatial streams transmitted to the transmission target STA through MU-MIMO or SU-MIMO. Channel bandwidth information used for NDP transmission may be set to a bandwidth value used for transmission of the NDPA frame.

The STA1 321 transmits a feedback frame to the AP 310 (step S331). The channel bandwidth information used for transmission of the feedback frame may be set to a value less than or equal to a channel bandwidth used for transmission of the NDPA frame.

The AP 310 transmits a feedback poll frame to the STA2 322 after receiving the feedback frame from the STA1 321 (step S341). The feedback poll frame is a frame for requesting the receiving STA to transmit the feedback frame. The feedback poll frame is transmitted in a unicast manner to an STA to which transmission of the feedback frame will be requested. Upon receiving the feedback poll frame, the STA2 322 transmits the feedback frame to the AP 310 (step S332). Subsequently, the AP 310 transmits the feedback poll frame to the STA3 323 (step S342). The STA3 323 transmits the feedback frame to the AP 310 in response to the feedback poll frame (step S333).

Various channel bandwidths may be used to transmit data in the WLAN system. In order to estimate channels for the various bandwidths, channel information for the various bandwidths may be fed back. The next generation WLAN system supports bandwidths of 20 MHz, 40 MHz, 80 MHz, contiguous 160 MHz, and non-contiguous 160 (80+80) MHz. Therefore, since channel information for each bandwidth is fed back, an amount of channel feedback information may increase.

In the present invention, channel information based on channel estimation performed by an STA is transmitted by being included in a feedback frame transmitted from the STA to an AP. The feedback frame includes a channel information field and a channel information control field. Table 2 and Table 3 below show formats of the channel information control field and the channel information field.

TABLE 2

| Subfield | Description |
| --- | --- |
| Nc Index | Indicate the number of columns of a beamforming feedback matrix<br>0 if Nc = 1<br>1 if Nc = 2<br>. . .<br>7 if Nc = 8 |
| Nc Index | Indicate the number of rows of a beamforming feedback matrix<br>0 if Nr = 1<br>1 if Nr = 2<br>. . .<br>7 if Nr = 8 |
| channel bandwidth | Indicate a bandwidth of an estimated channel<br>0 if 20 MHz<br>1 if 40 MHz<br>2 if 80 MHz<br>3 if 160 MHz or 80 + 80 MHz |
| grouping, Ng | The number of carriers for grouping<br>0 if Ng = 1<br>1 if Ng = 2<br>2 if Ng = 4<br>(3 is reserved) |
| codebook information | Indicate a size of codebook entries |
| MU-scheme | Indicate whether beamforming feedback is for SU-MIMO or MU-MIMO |
| sounding sequence | A sequence number from an NDPA that requests feedback |

TABLE 3

| Subfield | Description |
| --- | --- |
| SNR(signal to noise ratio) of spatial stream 1 | average SNR on subcarriers in a recipient for a first spatial stream |
| . . . | . . . |
| SNR of spatial stream Nc | average SNR on subcarriers in a recipient for an $Nc^{th}$ spatial stream |
| beamforming feedback matrix (subcarrier index 0) | order of an angle of a beamforming feedback matrix for a corresponding subcarrier |
| beamforming feedback matrix (subcarrier index 1) | order of an angle of a beamforming feedback matrix for a corresponding subcarrier |
| . . . | . . . |
| beamforming feedback matrix (subcarrier index Ns) | order of an angle of a beamforming feedback matrix for a corresponding subcarrier |

Information of the channel information field disclosed in Table 3 can be interpreted based on information included in the channel control field disclosed in Table 2.

Figure 4:
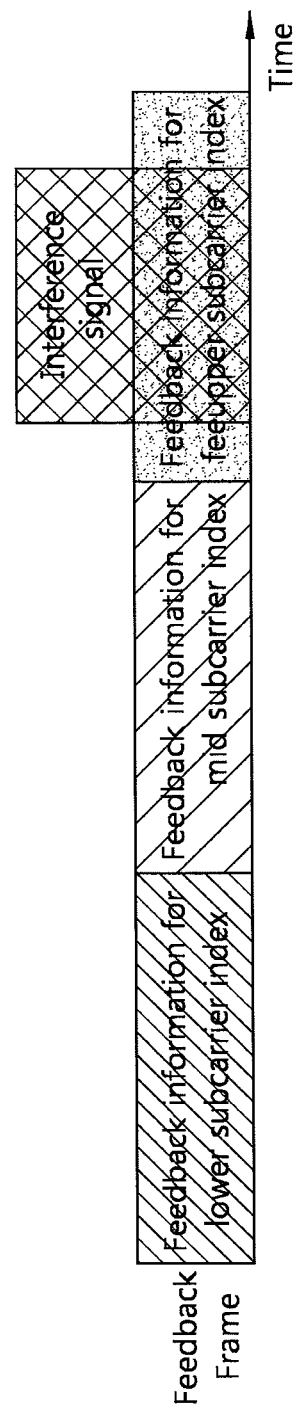
FIG. 4 shows an example of corruption occurrence in a part of receiving signal.

In the next generation WLAN system, the MU-MIMO transmission scheme is supported and thus more channels are present between an AP and a plurality of MU-MIMO paired STAs. Further, since a channel bandwidth of a broader band is supported to increase a throughput, an amount of channel information to be fed back by the STA can be significantly increased. For example, an interference signal may be received in a part of time duration in a process of transmitting SNR information for 8 spatial streams and transmitting feedback information corresponding to 160 MHz bandwidth, and corruption may occur in a part which is intended to be normally received in the time duration. An example thereof can be found in FIG. 4.

If all feedback frames are subjected to error detection by using the same checksum, there is no way for a recipient of the feedback frames to determine at which part an error occurs, which leads to a state where the whole feedback frame has to be discarded. In addition, a transmitter of the feedback frame transmits again the feedback frame by including large-sized channel information. For this, a channel is occupied, and thus overall throughput of the WLAN system may deteriorate.

If a great amount of channel information has to be fed back as described above, it is proposed to segment the channel information on a bandwidth or a spatial stream basis and transmit the segmentations by considering them as respective feedback units. Although the channel information is segmented on the bandwidth basis in a method to be described hereinafter, the present invention is also applicable when the channel information is segmented on the spatial stream basis.

In a case where a data sequence to be transmitted becomes too long, the data sequence can be segmented and thus can be transmitted in a data unit. However, if channel information to be fed back is segmented on any bit basis, a specific feedback unit itself is not self-decodable, and can be decoded and utilized as understandable information only when previous bit information is known. To avoid such a problem, there is a need to perform segmentation on a specific bandwidth or spatial stream basis so that each segment itself is decodable. For example, when channel information per bandwidth is fed back, the channel information can be segmented and then can be included in a plurality of data units, and the plurality of data units can be generated in an aggregated MAC protocol data unit (A-MPDU) and then the A-MPDU can be transmitted. In this case, each channel information is included in a MAC protocol data unit (MPDU) which is a data unit exchanged by a MAC entity, and the A-MPDU has a structure including a plurality of MPDUs and can be transmitted or transported as one PSDU which is a service data unit managed in a physical layer.

Figure 5:
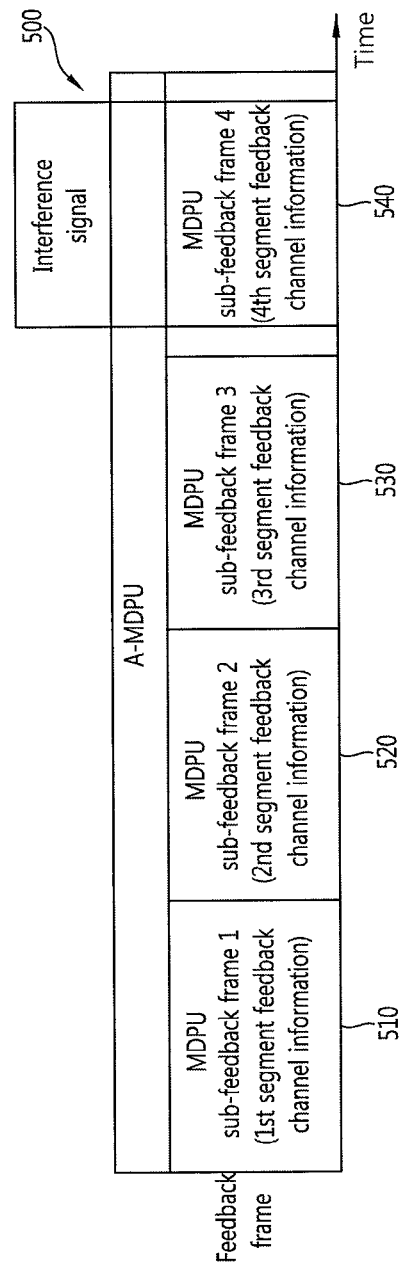
FIG. 5 shows an example of a feedback frame applicable to an embodiment of the present invention.

FIG. 5 shows an example of a feedback frame applicable to an embodiment of the present invention.

Referring to FIG. 5, a feedback frame 500 according to the embodiment of the present invention has an A-MPDU format, and can be transmitted in a PPDU format by appending a preamble and a PLCP header. The feedback frame 500 includes four sub-feedback frames 510, 520, 530, and 540. However, a specific number of subframes shown in FIG. 5 is for exemplary purposes only, and thus the number of subframes may be greater than or equal to 4 according to a size of channel information. Each sub-feedback frame may have an MPDU format. Each sub-feedback frame includes segment feedback channel information. The segment feedback channel information may be channel information for a specific spatial stream or channel information for a specific bandwidth. In the present embodiment, the segment feedback channel information implies channel information for a specific channel bandwidth. A plurality of pieces of segment feedback channel information may be configured to have the same amount except for a last segment.

Referring to FIG. 5, since an interference signal is detected together at a time of receiving the sub-feedback frame #4 540, the AP is unable to normally acquire $4^{th}$ segment feedback information. According to the conventional channel sounding method, retransmission is requested for whole feedback channel information when a part of the feedback channel information is not correctly received due to a reception signal interference. On the other hand, when a sounding target STA segments the feedback channel information and transmits it in an A-MPDU format according to the embodiment of the present invention, even if a signal interference acts on a part of the feedback channel information, retransmission may be requested for segment feedback channel information including that part. This can be performed by a method of transmitting a report poll frame to an STA in order to retransmit specific segment feedback channel information.

Figure 6:
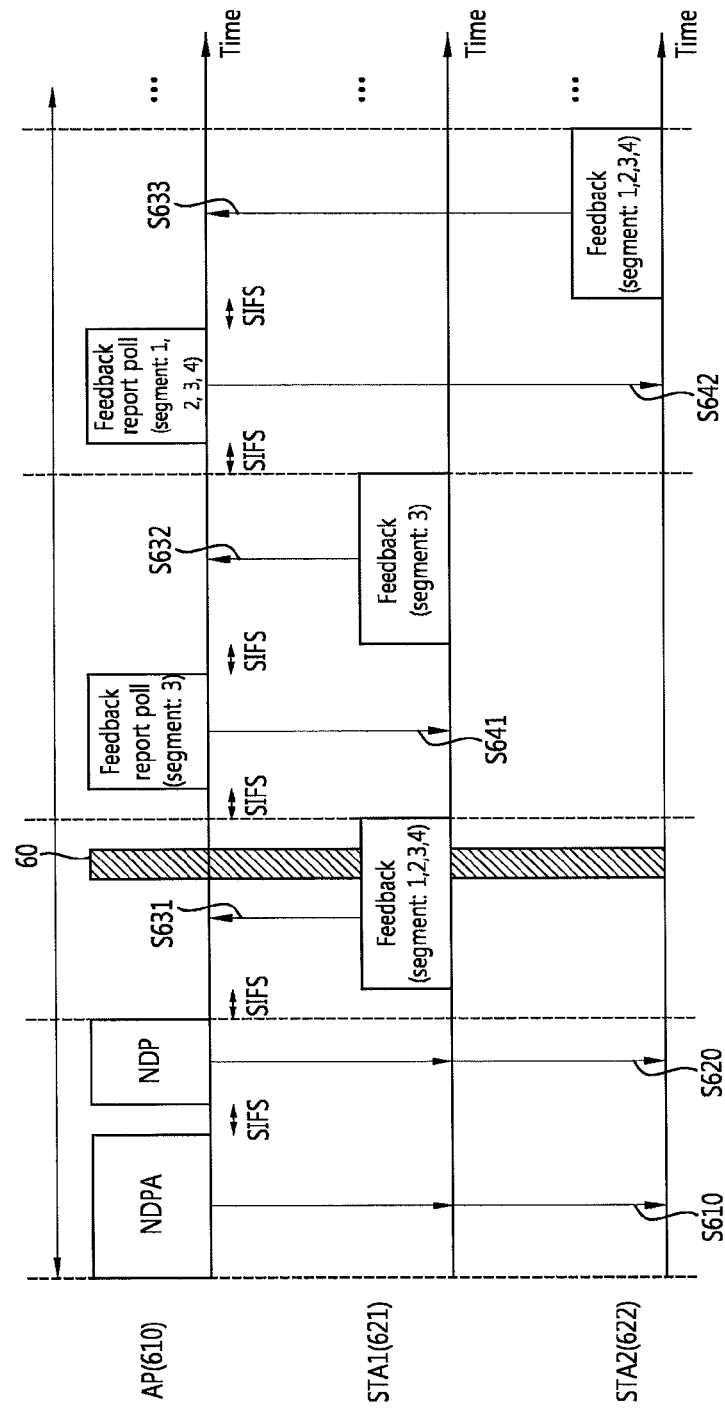
FIG. 6 shows an example of a channel sounding method according to an embodiment of the present invention.

FIG. 6 shows an example of a channel sounding method according to an embodiment of the present invention.

Referring to FIG. 6, an AP 610 transmits an NDPA frame to an STA1 621 and an STA2 622 (step S610). The NDPA frame is for announcing information identifying an STA for transmitting a feedback frame before NDP transmission. The AP 610 transmits the NDPA frame by inserting STA information field including information on sounding target STAs, i.e., STA1 621 and STA2 622, into the NDPA frame. A format of the STA information field included in the NDPA frame and included information are as shown in the STA information field described with reference to FIG. 3.

Subsequent to transmission of the NDPA frame, the AP 610 transmits an NDP frame to the STA1 621 and the STA2 622 (step S620). The NDP is subjected to be beamformed by the AP 610, and is transmitted to the STA1 621 and the STA2 622 by using at least one or more spatial streams. Therefore, the STA1 621 and the STA2 622 may estimate channels by using a VHT-LTF of the NDP. A plurality of pieces of control information included in the NDP are the same as those of the NDP described with reference to FIG. 3.

The STA1 621 transmits a feedback frame to the AP 610 (step S631). Channel bandwidth information used for transmission of the feedback frame can be configured to have a bandwidth narrower than or equal to a channel bandwidth used for transmission of the NDPA frame. A foimat of the feedback frame includes four sub-feedback frames including segment feedback information similarly to the feedback frame format of FIG. 5.

The sub-feedback frame to be transmitted by being included in the feedback frame is transmitted by including one piece of segment feedback channel information, and when transmitting feedback channel information for a wide bandwidth, it can be transmitted by using several pieces of segment feedback channel information. In this case, in order to make the segment feedback information self-understandable/decodable, the feedback information is transmitted by further including control information required to interpret the segment feedback channel information for each piece of segment feedback channel information. This will be described in greater detail with reference to FIG. 7 and FIG. 8.

Figure 7:
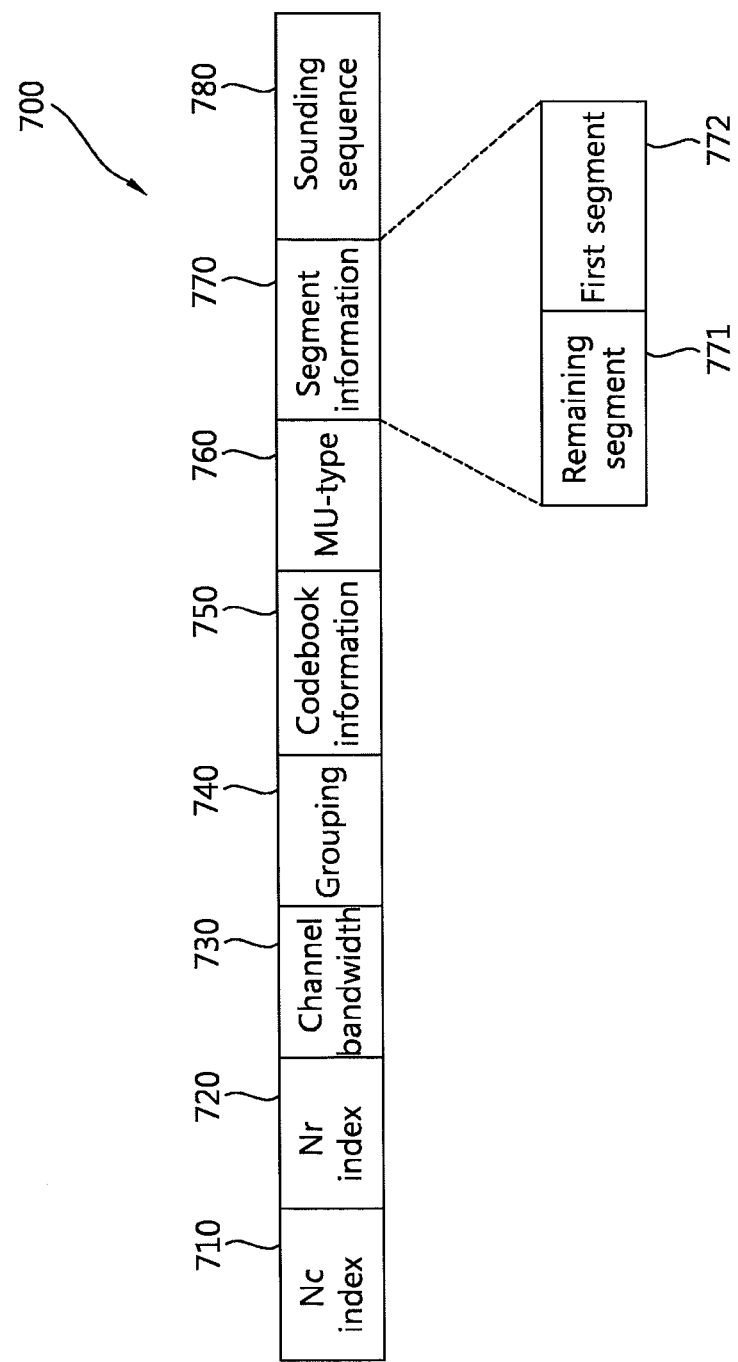
FIG. 7 is a diagram showing a format of a feedback control field that can be included in a segment feedback frame according to an embodiment of the present invention.

FIG. 7 is a diagram showing a format of a feedback control field that can be included in a segment feedback frame according to an embodiment of the present invention. A segment feedback control field includes control information required to interpret segment feedback information included in the segment feedback frame.

Referring to FIG. 7, a feedback control field 700 includes an Nc index subfield 710, an Nr index subfield 720, a channel bandwidth subfield 730, a grouping subfield 740, a codebook information subfield 750, a multi user (MU)-type subfield 760, a segment information subfield 770, and a sounding sequence subfield 780. The subfields other than the segment information subfield 770 include information of Table 2, and can be configured depending on the information.

The segment information subfield 770 includes information indicating to which segment the segment feedback information belongs. The segment information subfield includes a remaining-segment subfield 771 and a first-segment subfield 772.

The remaining-segment subfield 771 includes information indicating the number of pieces of remaining-segment feedback channel information in an associated feedback frame. For example, if a currently confirmed remaining-segment subfield value is 5, five pieces of feedback channel information are more present. When a segmented feedback frame is transmitted or when a non-segmented feedback frame is transmitted, the remaining-segment subfield 771 is set to '0' when transmitted. When the segment feedback channel information is retransmitted, the remaining-segment subfield 771 can be set to the same value which is set for the segment feedback channel information in original transmission.

The first-segment subfield 772 may be set to '1' if specific segment feedback channel information of the segmented feedback frame corresponds to a first segment or if a non-segmented feedback frame is transmitted, and may be se to '0' in other cases. When segment feedback channel information is retransmitted, the first-segment subfield 772 may be set to be equal to a value which is set for the segment feedback channel information in original transmission.

Upon receiving a sub-feedback frame, the AP can know a specific order of segment feedback channel information included in the frame by using values which are set in the remaining-segment subfield 771 and the first-segment subfield 772, and can determine whether a specific segment feedback channel is normally received. For example, if a sub-feedback frame of which the first-segment subfield 772 is set to '1' is not successfully received, it can be determined that reception of first segment feedback channel information fails. In addition, values of the remaining-segment subfield 771 can be checked for to determine a presence or absence of missing segment feedback channel information according to whether the values are sequentially decreased from a specific number to zero.

Figure 8:
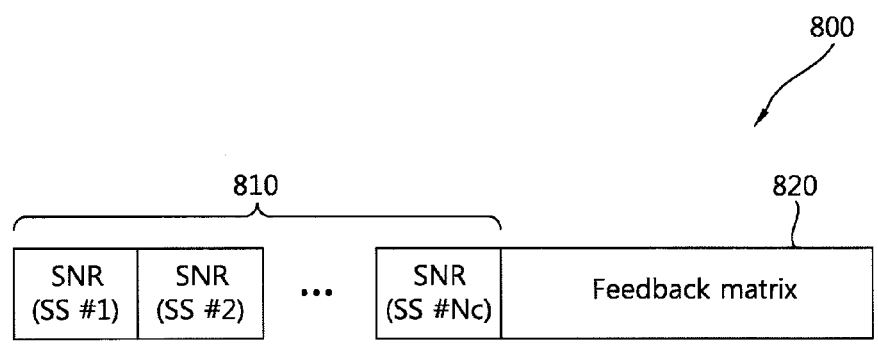
FIG. 8 is a diagram showing a channel information field format that can be included in a segment feedback frame according to an embodiment of the present invention.

FIG. 8 is a diagram showing a channel information field format that can be included in a segment feedback frame according to an embodiment of the present invention. Segment feedback channel information transmitted by an STA is transmitted by being included in a channel information field.

Referring to FIG. 8, a channel information field 800 includes a plurality of SNR subfields 810 indicating an average SNR value for a spatial stream and a feedback matrix subfield 820. Each SNR subfield indicates a recipient-side SNR value for a specific spatial stream or spatial stream set. The feedback matrix subfield 820 includes a feedback matrix related value as segment feedback information.

Meanwhile, since one time transmission is enough for information indicating an SNR value for a spatial stream, it may be unnecessary to transmit the information by inserting it into each of a plurality of segment feedback frames. Therefore, a feedback frame can be configured such that a specific segment feedback frame includes an SNR subfield but other segment feedback frames do not include the SNR subfield. Alternatively, according to implementation, the SNR subframe can be included in all segment feedback frames when transmitted. This is because although the SNR subfield is included in one segment feedback frame when transmitted, a delay may occur until SNR information for each spatial stream is received again if an AP and/or a reception STA cannot normally receive the segment feedback frame.

Referring back to FIG. 6, signal interference does not occur when the STA1 621 receives sub-feedback frames 1, 2, and 4, and thus decoding is normally performed and $1^{st}$, $2^{nd}$, and $4^{th}$ pieces of segment feedback channel information are normally acquired. On the other hand, when receiving a sub-feedback frame 3, a signal interference 60 occurs and thus decoding cannot be normally performed on a $3^{rd}$ sub-feedback frame, and eventually a $3^{rd}$ piece of segment feedback channel information may not be acquired. Therefore, the AP 610 has to request the STA1 621 to retransmit the $3^{rd}$ piece of segment feedback channel information which cannot be decoded since it fails to be received normally.

The AP 610 transmits a feedback report poll frame to request the STA1 621 to retransmit the $3^{rd}$ piece of segment channel feedback information (step S641). The feedback report poll frame transmitted by the AP 610 includes information indicating segment feedback channel information which is desired to be retransmitted. In particular, if indication information for requesting any segment feedback channel information among a plurality of pieces of segment feedback channel information is included, the indication information can be implemented in a bitmap format. For this, the feedback report poll frame may include a segment retransmission indication field. If a specific bit is set to '1' in a bit-stream constituting the segment retransmission indication field, it can be interpreted that retransmission of segment feedback channel information related to that bit is requested. However, it can be configured such that a value '0' implies a retransmission request. In the example of FIG. 6, the bit-stream constituting the segment retransmission indication field included in the feedback report poll frame transmitted by the AP 610 in step S641 can be set to '0 0 1 0'.

The STA1 621 may receive the feedback report poll frame and confirm a value of the segment retransmission indication field and thus may know that retransmission of the $3^{rd}$ piece of segment feedback channel infoiination is necessary. The STA1 621 transmits a feedback frame to the AP 610 in response to the feedback report poll frame (step S632). The feedback frame may include only the $3^{rd}$ piece of segment feedback channel information which is retransmission target segment feedback channel information indicated by the segment retransmission indication field or may include all pieces of segment feedback channel information. The retransmitted feedback frame may include a feedback control field and a channel information field as shown in the format of FIG. 7 and FIG. 8.

The AP 610 receives the segment feedback channel information of which retransmission is requested from the STA1 621, and thereafter transmits a feedback report poll frame to the STA2 622 (step S642). Since the AP 610 has to request the STA2 622 to transmit the whole feedback channel information, the report poll frame may include a segment retransmission indication filed which is configured to indicate the whole segment feedback channel information. As such, when performing a channel sounding method, if the AP 610 intends to acquire channel feedback information from an STA other than a target STA to which a feedback frame will be first transmitted, the feedback report poll frame including the segment retransmission indication field configured to indicate the entire segment feedback channel information can be transmitted to the STA.

The STA2 622 transmits to the AP 610 a feedback frame including channel estimation information in response to the report poll frame received from the AP 610 (step S633). The feedback frame transmitted by the STA2 622 may include the feedback control field and the channel information field as shown in the format of FIG. 7 and FIG. 8.

In the defining of the segment feedback information, the embodiment of the present invention proposes to additionally divide a bandwidth into 20 MHz, 40 MHz, or 80 MHz.

Figure 9:
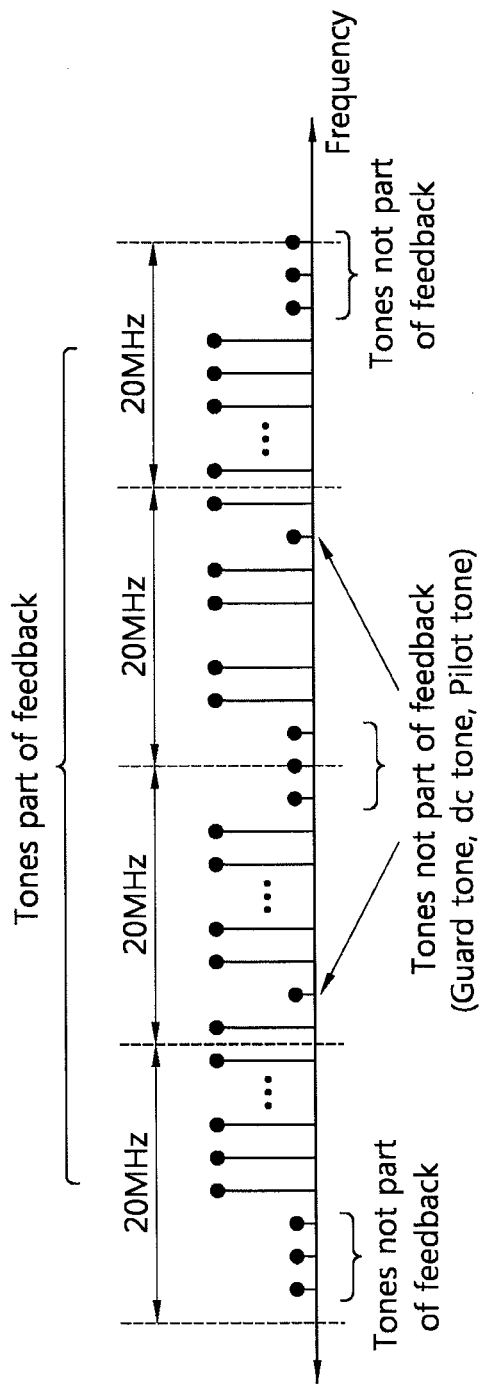
FIG. 9 shows a conceptual location of a subcarrier tone to be fed back according to an embodiment of the present invention.

FIG. 9 shows a conceptual location of a subcarrier tone to be fed back according to an embodiment of the present invention.

Referring to FIG. 9, feedback information of 80 MHz may be divided by 20 MHz to generate a plurality of pieces of segment feedback channel information, and a sub-feedback frame based on a MPDU format may be configured for each piece of segment feedback channel information and then may be fed back in an A-MPDU format. A reference bandwidth used for segmentation may be not only 20 MHz but also 40 MHz or a specific bandwidth higher than 40 MHz. When transmitting the feedback channel information by dividing the information in this manner, the segment feedback channel information needs to be indexed and indication information thereof needs to be provided.

In addition, when an AP performs channel sounding on one STA, a report poll frame is not necessarily used to perform sounding, but a feedback matrix or feedback information such as a channel coefficient can be individually acquired by transmitting an NDPA frame and an NDP frame.

In a case where specific segment feedback channel information is not normally received when receiving a feedback by attempting sounding one time, a method capable of selectively receiving the specific segment feedback channel information again by using the NDPA frame and the NDP frame is proposed.

For this, information indicating that the specific segment feedback channel information will be selectively transmitted may be included in the NDPA frame when transmitted. As such, when retransmission of the segment feedback channel information is requested by reusing the NDPA frame and the NDP frame, since this is a case where retransmission is requested only for specific one STA, the STA information field of the NDPA frame may include only a field for one STA.

In addition, when the AP performs channel sounding on a plurality of STAs, it is possible to request a specific STA to feedback only specific feedback channel information.

Figure 10:
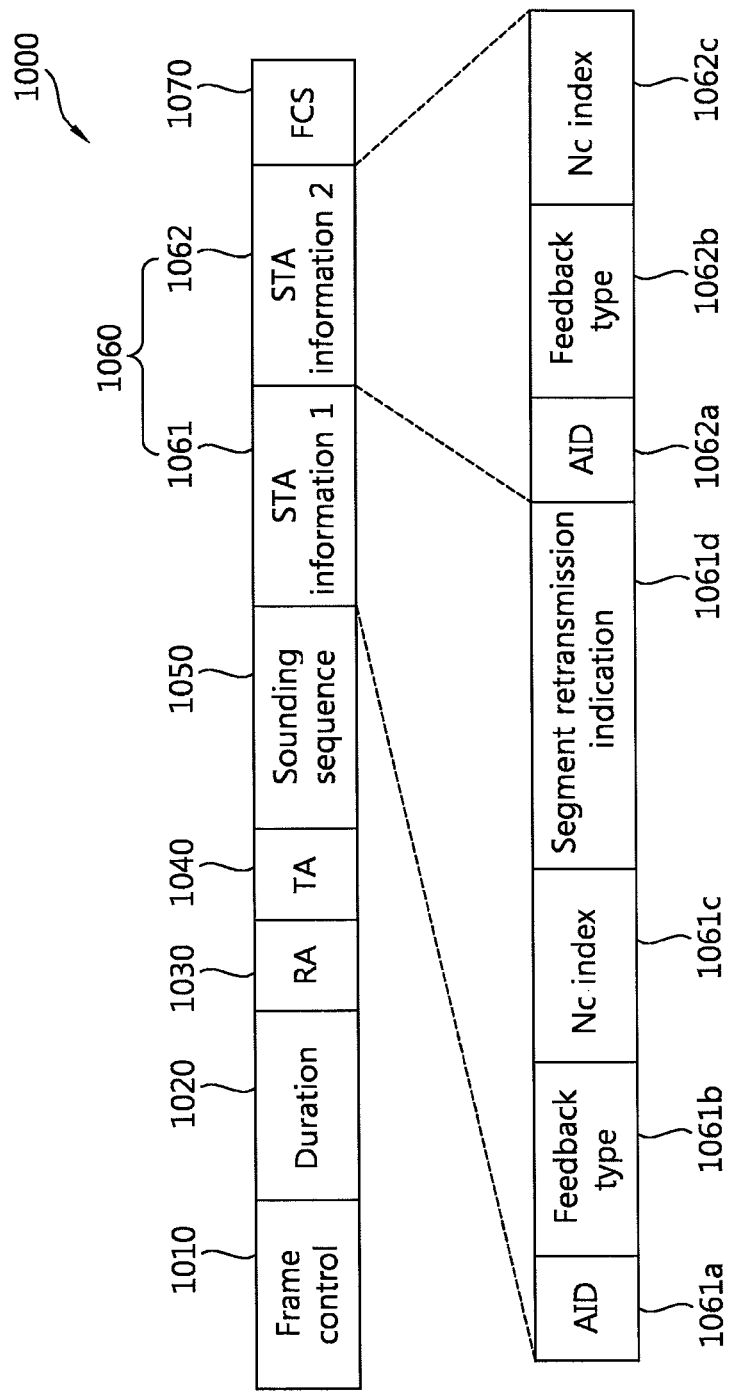
FIG. 10 shows an example of an NDPA frame format according to an embodiment of the present invention.

FIG. 10 shows an example of an NDPA frame format according to an embodiment of the present invention.

Referring to FIG. 10, an NDPA frame 1000 includes a frame control field 1010, a duration field 1020, a receiver address (RA) field 1030, a transmitter address (TA) field 1040, a sounding sequence field 1050, at least one or more STA information fields 1060, and an FCS field 1070.

The frame control field 1010 includes control information for the NDPA frame 1000. The duration field 1020 includes length information of the NDPA frame 1000. The RA field 1030 can be set to a broadcast address, but if sounding is requested to one specific STA, can be set to a MAC address of the STA. The TA field 1040 can be set to a MAC address of an AP that transmits the NDPA frame 1000. The sounding sequence field 1050 is set to a sequence number for a current sounding sequence. The FCS field 1070 includes CRC related information for frame transmission and reception.

An STA information field #1 1061 and an STA information field #2 1062 include AID subfields 1061a and 1062a indicating AIDs of sounding target STA1 and STA2, feedback type subfields 1061b and 1062b indicating a feedback request type for the sounding target STA, and Nc index fields 1061c and 1062c indicating a feedback dimension. The number of STA information fields 1060 can change depending on the number of sounding target STAs, and sounding requested to two STAs in the present embodiment is for exemplary purposes only.

However, when the AP requests the STA1 to selectively retransmit segment feedback channel information, the STA information field 1060 for the STA1 may further include a segment retransmission indication subfield 1061d. The segment retransmission indication subfield 1061d can be configured similarly to the segment retransmission indication subfield included in the aforementioned report poll frame.

When the AP broadcasts an NDPA frame having the aforementioned frame format, the STA1 and the STA2 receive the NDPA frame 1000 and can know that it is an NDPA frame for the STA1 and the STA2 by using the AID subfields 1061a and 1062a of the STA information fields 1061 and 1062. Thereafter, when the AP sends the NDP frame, each feedback frame is transmitted to the AP, and in this case, the STA1 may feedback only segment feedback channel information indicated by the segment retransmission indication subfield 1061d included in the NDPA frame 1000.

Figure 11:
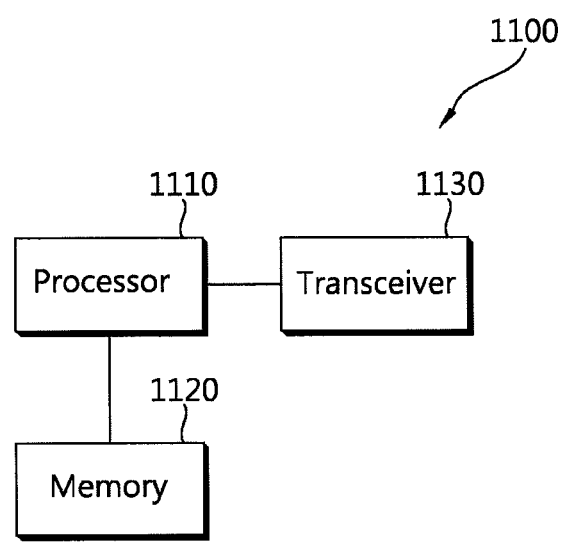
FIG. 11 is a block diagram showing a wireless apparatus to which an embodiment of the present invention is applicable.

FIG. 11 is a block diagram showing a wireless apparatus to which an embodiment of the present invention is applicable. The wireless apparatus may be an AP or an STA.

The wireless apparatus 1100 includes a processor 1110, memory 1120, and a transceiver 1130. The transceiver 1130 transmits and/or receives a radio signal and implements the physical layer of the IEEE 802.11 standard. The processor 1110 is operatively coupled to the transceiver 1130 and implements the MAC layer and the PHY layer of the IEEE 802.11 standard.

A processor 1110 can be configured to generate and transmit an NDPA frame, an NDP, and a feedback report poll frame proposed in the present invention, and can also be configured to receive the transmitted frame and interpret an included field value in order to acquire control information. In addition, the processor 1110 can be configured to transmit feedback channel information in association with request information included in the frame or can be configured to selectively transmit segment feedback channel information. The processor can be configured to implement the aforementioned embodiment of the present invention described with reference to FIG. 2 and FIG. 10.

The processor 1110 and/or the transceiver 1130 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1120 and may be performed by the processor 1110. The memory 1120 may be located inside or outside the processor 1110, and may be coupled to the processor 1110 by using various well-known means.

According to a channel sounding procedure of the present invention, a channel bandwidth of a wideband and channel information increased due to the support of a multi user-multiple input multiple output (MU-MIMO) transmission scheme are separately transmitted. In doing so, even if a part of full channel information to be fed back is lost, the remaining parts can be utilized as normal channel information, thereby increasing reliability of frame transmission.

In addition, when the part of the full channel information to be fed back is lost, retransmission can be requested for the channel information and thus retransmission can be performed in response thereto. In doing so, a time required for unnecessarily accessing to a channel for the channel sounding procedure can be reduced, thereby increasing efficiency of a channel sounding method and improving a throughput of an overall wireless location area network (WLAN).

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for channel sounding in a wireless local area network, the method performed by a transceiver and comprising:
   receiving a null data packet announcement (NDPA) frame from a transmitter to initiate the channel sounding;
   receiving a null data packet (NDP) from the transmitter, the NDP following the NDPA frame;
   in response to receiving the NDPA frame and the NDP frame, transmitting first feedback data split into a plurality of segments in a single aggregated medium access control protocol data unit (A-MPDU) to the transmitter;
   receiving a retransmission request from the transmitter, the retransmission request including a segment retransmission bitmap field indicating at least one segment of the plurality of segments for retransmission; and
   in response to the retransmission request, transmitting second feedback data including the at least one segment indicated in the segment retransmission bitmap field.

2. The method of claim 1, wherein each of the plurality of segments is identified by an initial segment subfield and a remaining segment subfield,
   wherein the initial segment subfield indicates whether or not a corresponding segment is an initial segment of the plurality of segments, and
   wherein the remaining segment subfield indicates a number of remaining segments.

3. The method of claim 1, wherein the transceiver is equipped in a non-access point (non-AP) device.

4. The method of claim 1, wherein the first feedback data includes beamforming information and a report field indicating signal to noise ratio (SNR) information.

5. A device configured to perform channel sounding in a wireless local area network, the device comprising:
   a transceiver; and
   a controller operatively connected to the transceiver and configured to:

receive a null data packet announcement (NDPA) frame from a transmitter to initiate the channel sounding;

receive a null data packet (NDP) from the transmitter, the NDP following the NDPA frame;

in response to receiving the NDPA frame and the NDP frame, transmit first feedback data split into a plurality of segments in a single aggregated medium access control protocol data unit (A-MPDU) to the transmitter;

receive a retransmission request from the transmitter, the retransmission request including a segment retransmission bitmap field indicating at least one segment of the plurality of segments for retransmission; and in response to the retransmission request, transmit second feedback data including the at least one segment indicated in the segment retransmission bitmap field.

6. The device of claim 5, wherein each of the plurality of segments is identified by an initial segment subfield and a remaining segment subfield, wherein the initial segment subfield indicates whether or not a corresponding segment is an initial segment of the plurality of segments, and wherein the remaining segment subfield indicates a number of remaining segments.

7. The device of claim 5, wherein the device is a non-access point (non-AP) device.

8. The device of claim 5, wherein the first feedback data includes beamforming information and a report field indicating signal to noise ratio (SNR) information.

9. A device configured to perform channel sounding in a wireless local area network, the device comprising:

a transceiver; and a controller operatively connected to the transceiver and configured to:

transmit a null data packet announcement (NDPA) frame to a receiver to initiate the channel sounding, transmit a null data packet (NDP) to the receiver, the NDP following the NDPA frame, in response to transmitting the NDPA frame and the NDP frame, receive first feedback data in a plurality of segments in a single aggregated medium access control protocol data unit (A-MPDU) including MPDUs from the receiver, wherein the first feedback data includes a first report field including beamforming information and a second report field including signal to noise ratio (SNR) information, transmit a retransmission request to the receiver, the retransmission request including a segment retransmission bitmap field indicating at least one segment of the plurality of segments for retransmission, and in response to the retransmission request, receive second feedback data including the at least one segment indicated in the segment retransmission bitmap field.

10. The device of claim 9, wherein each of the plurality of segments is identified by an initial segment subfield and a remaining segment subfield, wherein the initial segment subfield indicates whether or not a corresponding segment is an initial segment of the plurality of segments, and wherein the remaining segment subfield indicating a number of remaining segments.

11. The device of claim 9, wherein the device is an access point (AP).

12. The device of claim 9, wherein the first feedback data includes beamforming information and a report field indicating signal to noise ratio (SNR) information.

* * * * *